United States Patent [19]

Matsuguchi et al.

[11] Patent Number: 5,011,190
[45] Date of Patent: * Apr. 30, 1991

[54] TEMPORARILY STICKING MATERIAL

[75] Inventors: Noboru Matsuguchi; Tadaski Matsuguchi, both of Suita, Japan

[73] Assignee: Daimatsu Kagaku Kogyo Co., Ltd., Osaka, Japan

[*] Notice: The portion of the term of this patent subsequent to Apr. 9, 2008 has been disclaimed.

[21] Appl. No.: 245,883

[22] Filed: Sep. 16, 1988

[30] Foreign Application Priority Data

Sep. 18, 1987 [JP] Japan ................................. 62-235331
Sep. 14, 1988 [JP] Japan ................................. 63-231303

[51] Int. Cl.$^5$ .......................... B42D 15/00; B32B 3/00
[52] U.S. Cl. ..................................... 283/101; 283/903; 156/240; 428/204
[58] Field of Search ..................... 428/40, 41, 42, 202, 428/203, 204, 205, 352, 353, 354, 918, 916; 156/230, 240, 241, 289; 40/27, 360, 630; 283/109, 111, 901, 72, 108, 94, 101, 903

[56] References Cited

U.S. PATENT DOCUMENTS

| | | | |
|---|---|---|---|
| 2,180,808 | 11/1939 | Jacobstein et al. | 289/901 |
| 3,900,219 | 8/1975 | D'Amato et al. | 289/901 |
| 4,028,474 | 6/1977 | Martin | 428/40 |
| 4,308,310 | 12/1981 | Arnold | 428/353 |
| 4,555,436 | 11/1985 | Geurtsen | 428/352 |
| 4,557,963 | 12/1985 | Caines | 428/916 |
| 4,826,213 | 5/1989 | Matsuguchi et al. | 428/916 |

FOREIGN PATENT DOCUMENTS 54-3789 2/1979 Japan.

Primary Examiner—Michael W. Ball
Assistant Examiner—Louis Falasco
Attorney, Agent, or Firm—Jordan and Hamburg

[57] ABSTRACT

This temporarily sticking material includes a base material opaque at least partly, an inter-layer peel ply formed on the principal surface of the base material, a synthetic resin layer transparent at least partly formed on the principal surface of the inter-layer peel ply and an adhesive layer formed on the principal surface of the synthetic resin layer being transparent in the part corresponding to the transparent part of the synethic resin layer. The synthetic resin layer of the temporarily sticking material is stuck on a material to be sticked with the adhesive layer. The base material of the temporarily sticking material can be easily peeled off the synthetic resin layer in the part where the inter-layer peel ply is formed. And the secret information shown on the principal surface of the material to be sticked is visible through the synthetic resin layer when the base material is peeled off the synthetic resin layer.

5 Claims, 4 Drawing Sheets

FIG. 7
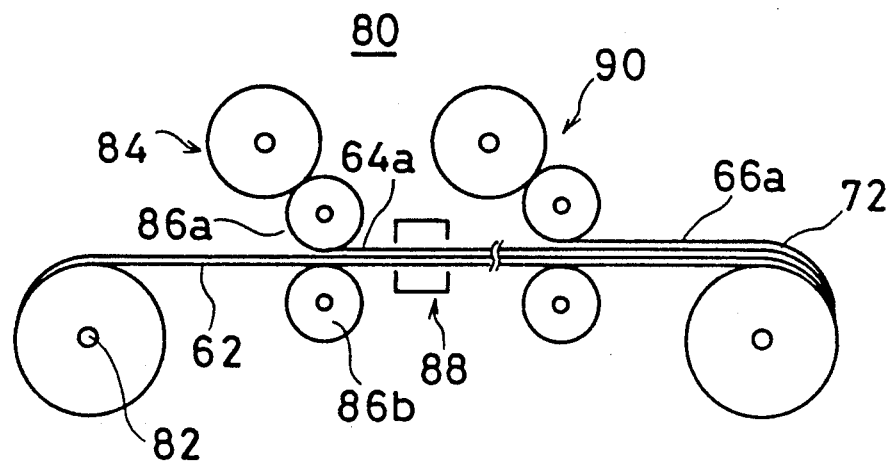
FIG. 8A
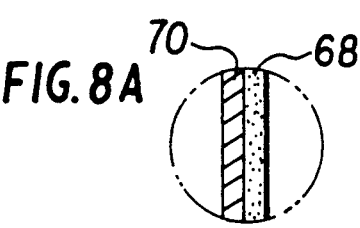
FIG. 8B
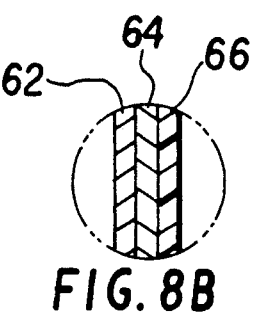
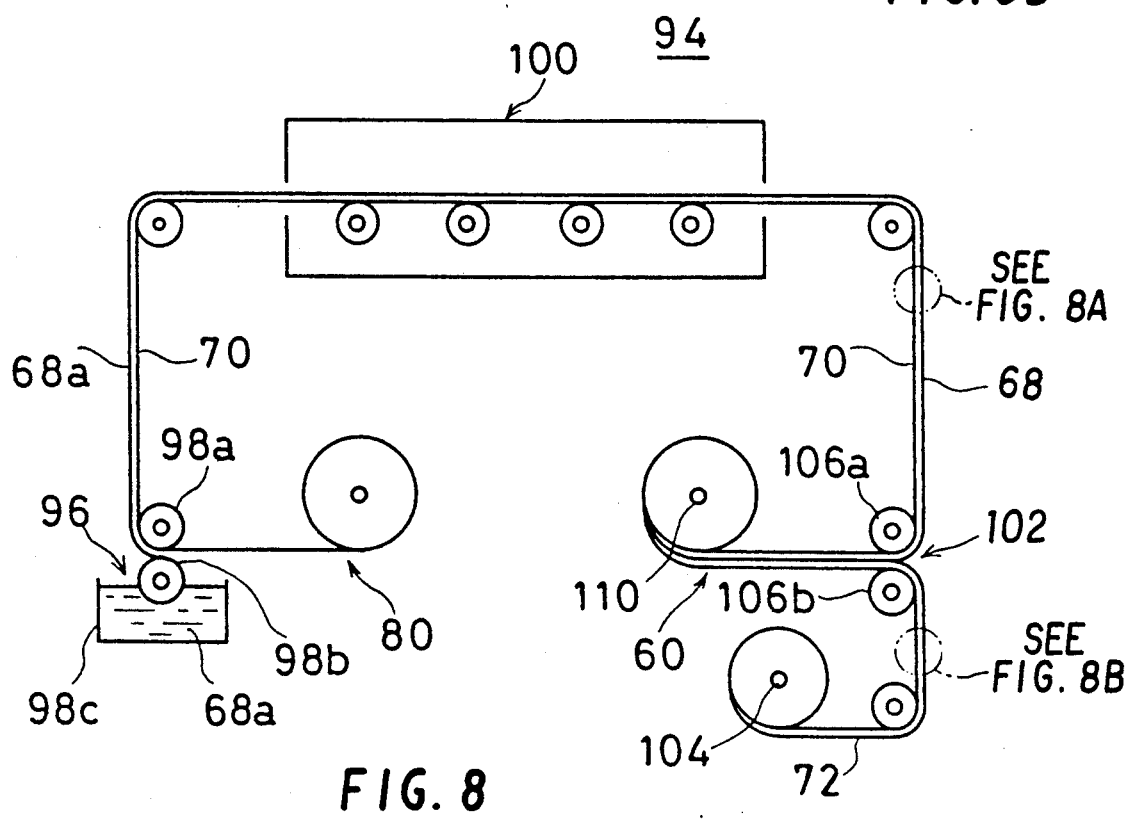
FIG. 8

TEMPORARILY STICKING MATERIAL

BACKGROUND OF THE INVENTION

1. Field of the Invention

The present invention relates to a temporarily sticking material and a manufacturing method thereof. Principally, the present invention relates to a temporarily sticking material which is preferably used as the sticking material divided into a portion adhered completely to a substrate and a portion adhered weakly thereto, whereby, for example, a portion provided with confidential matters is covered temporarily and if necessary, the portion adhered weakly is peeled off from the substrate sticked for access to the confidential portion, and a manufacturing method thereof.

2. Description of the Prior Art

Conventionally, as seen in Japanese Utility Model Patent Publication No. 54-3789, a laminate material in which an innerframe portion can be peeled off partially, has been developed.

However, in order to facilitate peeling partially, as shown in Japanese Utility Model Patent Publication No. 54-3789, a paper must be possible to peeled off partially by forming an adhesive surface formed by coating a dry paste entirely on the paper surface, and by subjecting the other base material to a peeling process such as silicon processing so as to be peeled off partially or only one laminate of the laminate material is peeled off. Thus, in the prior art laminate material, since the dry paste must be coated on one laminate side and the peeling processing such as silicon processing must be performed on the other laminate material side in manufacturing, structures of the laminate material become complicated and result in a high manufacturing cost due to many manufacturing processes.

SUMMARY OF THE INVENTION

Therefore, it is a principal object of the present invention to provide a temporarily sticking material in which surface treatment of the material to be adhered to is not required and only by post-processing of the temporarily sticking material, a portion which is possible to be peeled off partly and a portion which is adhered completely are divided so as to be used in various purposes complying with the user's needs, and a manufacturing method thereof.

A first embodiment relates to a temporarily sticking material comprising a base material opaque at least partly, an inter-layer peel ply formed on the principal surface of the base material, a synthetic resin layer formed on the principal surface of an inter-layer peel ply with at least part thereof being transparent and an adhesive layer formed on the principal surface of the synthetic resin layer and being transparent in the part corresponding to the transparent part of the synthetic resin layer.

A second embodiment relates to a manufacturing method of a temporarily sticking material comprising a step of preparing a base material opaque at least partly, a step of preparing a synthetic resin film or sheet for forming a synthetic resin layer transparent at least partly, a step of forming on one principal surface of the synthetic resin film or sheet an adhesive layer transparent in the part corresponding to the transparent part of the synthetic resin film or sheet, a step of printing or coating an inter-layer release agent at least on one principal surface of the base material or the synthetic resin film or sheet, and a step of forming an inter-layer peel ply between the base material and the synthetic resin layer formed of the synthetic resin film or sheet by laminating the synthetic resin film or sheet on the base material using the inter-layer release agent.

A third embodiment relates to another manufacturing method of a temporarily sticking material comprising a step of preparing a base material opaque at least partly, a step of forming a inter-layer peel ply by printing or coating a release agent on the principal surface of the base material, a step of forming a synthetic resin layer transparent at least partly by printing or coating a synthetic resin agent on the principal surface of the inter-layer peel ply, and a step of forming an adhesive layer on the surface of the synthetic resin layer, this adhesive layer being transparent in the part corresponding to the transparent part of the synthetic resin layer.

According to the present invention, the inter-layer peel ply is formed between the opaque base material and the synthetic resin layer and the aforementioned synthetic resin layer is stuck to the material to be adhered by means of the adhesive layer, and the base material can be peeled off with relative ease as it is stuck to the transparent synthetic resin layer relatively weakly where the inter-layer peel ply is formed, while the synthetic resin layer is kept stuck to the material to be adhered relatively strongly by the adhesion of the adhesive layer even after the base material is peeled off.

According to the present invention, the synthetic resin layer is stuck relatively strongly to the material to be adhered to by means of the adhesive layer, while the base material is stuck relatively weakly to the synthetic resin layer by means of the inter layer peel ply and is stuck to the material to be adhered to still weaker, hence the base material can be peeled off the material to be adhered to, that is, the synthetic resin layer formed thereon. After the base material has been peeled off from the material to be adhered to, the secret information on the principal surface of the material to be adhered to can be seen through the transparent part of the synthetic resin layer.

Moreover, by appling the temporarily sticking material without processing the material to be adhered to, a laminate, which can be divided into the base material stuck weakly on the material to be adhered to and the synthetic resin layer stuck completely, can be obtained, and the user is required only to do a simple pasting operation thus making this type of temporarily sticking material widely applicable.

Furthermore, the temporarily sticking material is just needed to be processed in manufacturing and the material to be adhered to is not necessary to be processed, so that its manufacturing process as well as an adhesion machine on the user's side can be simplified with ease.

The aforementioned objects and other objects, features and advantages of the present invention will become more apparent from reading of the detailed description of the embodiments given below under reference to the accompanying drawings.

BRIEF DESCRIPTION OF THE DRAWINGS

FIG. 6A and FIG. 6B are views showing a modification of the aforementioned embodiment, of which FIG. 6A is a sectional view and FIG. 6B is a partly broken-out perspective FIG. 7 and FIG. 8 are illustrative views showing an example of the manufacturing method for the embodiment shown in FIG. 6.

DESCRIPTION OF THE PREFERRED EMBODIMENT

Figure 1:
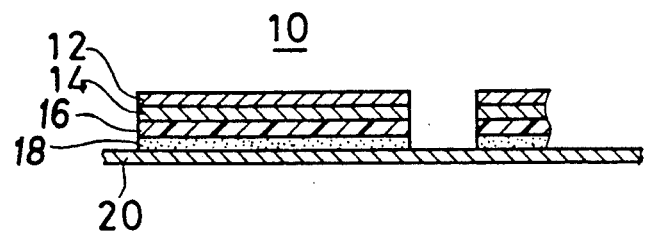
FIG. 1 is a sectional view showing a temporarily sticking material as an embodiment of the present invention.

FIG. 1 is a sectional view showing a temporarily sticking material embodying the present invention.

Figure 2:
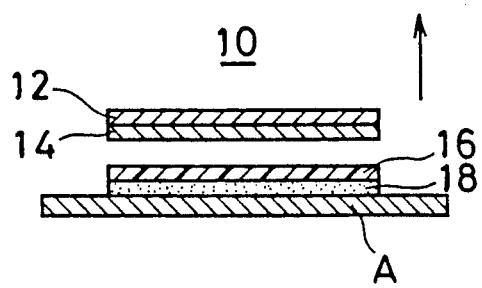
FIG. 2 is a sectional view showing an application of the above embodiment.

FIG. 2 is a sectional view 87 of an application of the aforementioned embodiment.

This temporarily sticking material 10 includes a base material 12 formed of an opaque material.

This base material 12 is formed of a relatively soft material such as paper or a synthetic resin film.

This base material 12, which is required to be opaque and have a suppressiveness, has to be made capable of covering by making it opaque by, for instance, printing it with a silver ink or the like to thereby form a suppression layer or laminating it with a film or foil having suppressiveness such as aluminum foil by the use of an adhesive or the like.

On one principal surface of the aforementioned base material 12, an inter-layer peel ply 14 is formed by printing or coating a wax.

As the wax forming this inter-layer peel ply 14 may be used any of the aminal, vegetable, mineral and petroleum-derived waxes, for instance, natural waxes such as paraffin wax, microcrystalline wax or petrolatum wax. Besides, also usable are, among others, Fischer tropush wax and its derivatives, synthetic hydrocarbons such as low-molecular polyethylene and its derivatives, modified waxes such as montan wax derivatives, paraffin wax derivatives and microcrystalline wax derivatives, aliphatic alcohols and acids such as cetyl alcohol and stearic acid, fatty acid esters such us glyceryl stearate and polyethylene glycol stearate, hydrogenated waxes such as glyceride, castor wax and opal wax, synthetic ketone amine amides such as armor wax and acra wax and, further, chlorinated bydrocarbons, synthetic aminal waxes, synthetic waxes such as alpha-olefin wax are as well usable. It is also possible to use mixed waxes containing any of the aforementioned waxes.

On one principal surface of the inter-layer peel ply 14, there is formed a synthetic resin layer 16 which is at least partly transparent.

This synthetic resin layer 16 is formed by laminating a synthetic resin film or sheet on the base material 12 by the use of the adhesion of the aforementioned inter-layer peel ply 14 or by printing or coating a synthetic resin dissolved in a solvent or dispersed in water.

On the principal surface of the aforementioned synthetic resin layer 16, an adhesive layer 18 is formed by printing or coating an adhesive of the pressure sensitive type. In this embodiment, the adhesive layer 18 is transparent on all surface of the part corresponding to the transparent part of the synthetic resin layer 16.

To the principal surface of this adhesive layer 18, there is a release sheet 20 which plays a role of continuously supporting the temporarily sticking material 10 which is divided into a plurality of parts, at the same time covering and protecting the adhesive layer 18.

Accordingly, the temporarily sticking materials 10 formed from the aforementioned base material 12, the inter-layer peel ply 14, the transparent synthetic resin layer 16 and the adhesive layer 18 are formed continuously at a prescribed distance on the release sheet 20, and are formed to be easily peeled off the release sheet 20 by the action of the release agent layer formed on the principal surface of the release sheet 20.

As the synthetic resin used for forming the forementioned synthetic resin layer 16 may be used any of polyethylene, ethylene-ethylacrylate copolymer resin, ethylene-acrylic acid copolymer resin, ethylene-methyl acrylate copolymer resin, ethylene-methylmethacrylate copolymer resin, ethylene-methacrylic acid copolymer resin, ionomer resin, polymethyl pentene resin, ethylene-vinyl alcohol copolymer resin, vinylidene chloride resin, vinyl chloride-vinyl acetate copolymer resin, polyamide resin, styrene-acrylic acid copolymer resin, polystyrene resin, polyacrylic acid copolymer resin, polyester resin, and polyurethane resin. For printing or coating with any thereof, the selected synthetic resin may be dissolved in a proper solvent or dispersed in water.

Figure 3:
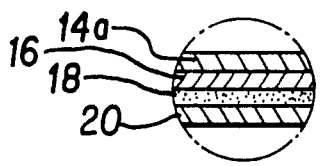
FIG. 3 is an illustrative view 87 of showing an example of the method of manufacturing the embodiment shown in FIG. 1.
Figure 3:
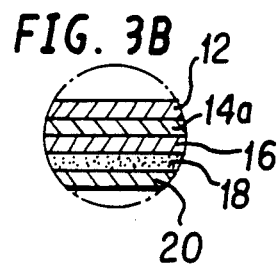
Figure 3:
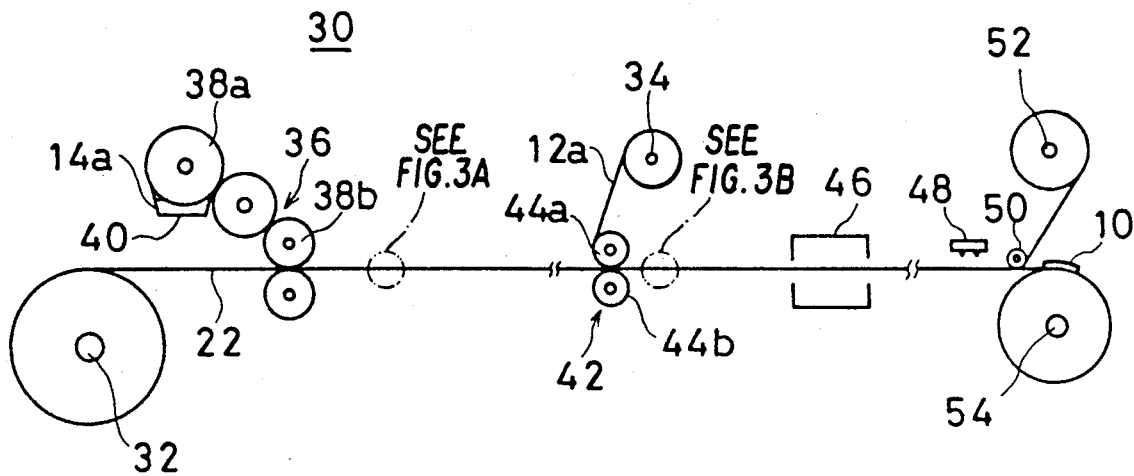

Now, to be described is the method of manufacturing the temporarily sticking material, referring mainly to FIG. 3.

First to be prepared is a piece of paper as material of the base material 12 and, if the suppressiveness of the paper is insufficient, either principal surface thereof is solid-printed with a silver ink by a known printing method such as offset printing or by coating to thereby form a suppression layer. Alternatively, for formation of this suppression layer, an aluminum foil may be stuck to the principal surface of the paper using, for instance, an adhesive of the pressure-sensitive type and this paper-aluminum foil laminate may be used as the base material 12.

Meanwhile, a laminate 22 is to be prepared by laminating the synthetic resin film or sheet used for forming the synthetic resin layer 16 on the surface of a laminate with an adhesive layer 18 preformed thereon by application of an adhesive of the pressure sensitive type on the principal surface of a release sheet 20 coated with a release agent.

This laminate 22 in a rolled form is mounted on the holding roller 32 of a manufacturing equipment 30 for the temporarily sticking material. Meanwhile, the base material 12 also in a rolled form, is mounted on the holding roller 34 of the same equipment 30.

Then, one end of the rolled-up laminate 22 is pulled out and led into the coating apparatus 36.

This coating apparatus 36 is for coating the surface of the synthetic resin layer 16 with an inter-layer release agent such as wax agent 14a for formation of the inter-layer peel ply thereon, and comprises two rollers 38a and 38b and also a storage vessel 40 and serves to apply by coating the heated and molten inter-layer release agent 14a with the rotating rollers 38a and 38b being.

As this coating apparatus 36, a coating machine such as a gravure roll coater or reverse roll coater may be used as well as a well-known printing machine such as an offset printing machine or a screen printing machine.

Thus, the laminate 22 coated with the inter-layer release agent 14a is led into a laminating machine 42 for further lamination with the base material 12 as shown in FIG. 3.

The laminating machine 42 for laminating a paper 12a to serve as the base material 12 on the surface of the inter-layer release agent 14a on the laminate 22 is arranged on the path for the laminate 22, and includes a holding roller 34 for holding the base material 12 in roll form.

This paper 12a has one end pulled out and this is introduced between the roller 44a and the opposing roller 44b. Then, the laminate 22 coated with the inter-layer release agent 14a is being led between the rollers 44a and 44b, hence between these rollers 44a and 44b the paper 12a is laid on the laminate 22 with the inter-layer release agent 14a in between. Thus, the laminate 22 with the paper 12a to serve as the base material 12 laid thereon is led through a cooler 46 or cooling roller (not shown).

The cooler 46 is for cooling the inter-layer release agent 14a applied between the laminate 22 and the paper 12a.

In the cooler 46, the inter-layer release agent 14a sandwiched between the laminate 22 and the paper 12a is cooled and solidified to form the inter-layer peel ply 14.

As mentioned above, the laminate further laminated with the base material 12 with the inter-layer peel ply 14 in between is led through a stamping unit 48. The stamping unit 48 includes a so-called die cutter, and by this die cutter proper cuts are made in the base material 12, inter-layer peel ply 14, synthetic resin layer 16 and adhesive layer 18. The stamping unit 48 may as well be of the type having an edged roll, a so-called die roll.

The laminate 22 further laminated with the base material 12 et cetera with cuts made therein is divided as it passes over a roller 50 between necessary and unnecessary parts and the unnecessary parts are wound round a waste take-up roller 52, while the temporarily sticking material 10 (neseccary parts) temporarily stuck to the release sheet 20 is wound round a take-up roller 54.

Instead of the stamping unit 48 and the take-up roller 54, a cut-making unit may as well be used. This cut-making unit includes a cutting blade for making cuts in the base material 12, inter-layer peel ply 14, synthetic resin layer 16 and adhesive layer 18 so as to divide the temporarily sticking material 10 into a plurality of parts.

The temporarily sticking material 10 is used as following.

Figure 4:
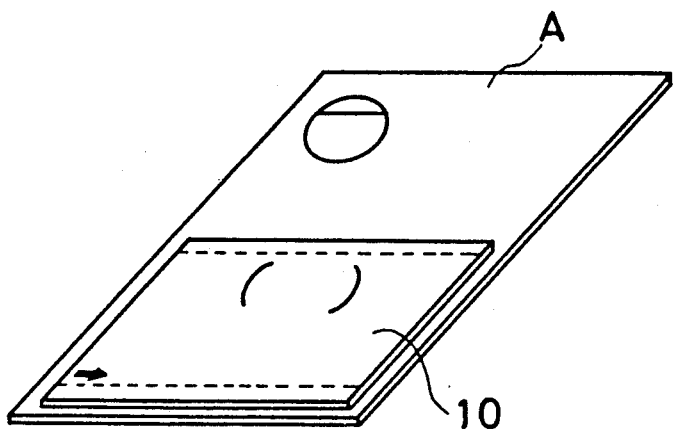
FIG. 4 is a perspective view a postcard utilized the above embodiment.
Figure 5:
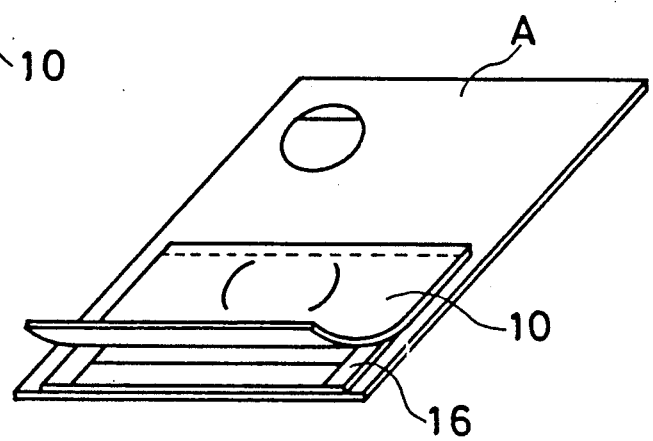
FIG. 5 is a perspective view showing a state in which the base material of the embodiment shown in FIG. 4 is peeled off.

For example, as shown in FIG. 4, to concealed the secret information such as the balance of a person's bank deposit on the surface of the substrate, the substrate A, such as the postcard is sent in successively, and the temporarily sticking material 10 is unrolled. When the temporarily sticking substrate 10 is longer than the material A, the size of the temporarily sticking material 10 is adjusted by cutting it in a suitable size. Next, one sticking material part of the temporarily sticking material 10 adjusted to a suitable size is disposed on a suitable part of the material to be sticked sent, and is sticked with the adhesive power of the adhesive layer 18 of the temporarily sticking material 10 surface by pressing the surface of the substrate A with a pressing roller.

When these are pressed and sticked, the synthetic resin layer 16 of the temporarily sticking material 10 is stuck strongly to the substrate A, and the base material 12 is stuck weakly because of the presence of the inter-layer peel ply 14. Hence, as shown in FIG. 2, the recipient can easily peel off the base material 12 from the substrate and can see the secret information such as the balance of the person's bank deposit under it through the transparent parts of the synthetic resin layer 16 and the adhesive layer 18.

As examples of the base, material 12 there can be cited, besides the one described in the aforementioned embodiment, synthetic paper, films of cellophane, polyethylene, polyester and the like or a aluminum foil et cetera, but it is advisable to choose one relatively soft lest this temporarily sticking material 10 stuck to the substrate A should accidentally come off the substrate A against the adhesion of the inter-layer peel ply 14.

When as the base material 12 what is excellent in suppressiveness such as aluminum foil has been selected, formation of a suppression layer such as in the aforementioned embodiment may be dispensed with.

Although in the aforementioned embodiment continuous paper in roll form was selected as the base material 12, it may as well be separated in sheet form.

The surface of the base material 12 may be printed in a mode suited for the substrate A, and when the base material 12, inter-layer peel ply 14 and synthetic resin layer 16 are formed to be continuous, marks for checking the feeding pitch of the base material 12 such as black arrows may be printed as shown in FIG. 4.

Figure 6A:
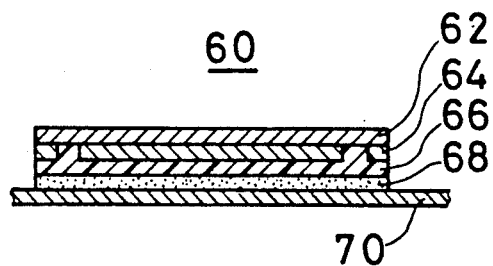
Figure 6B:
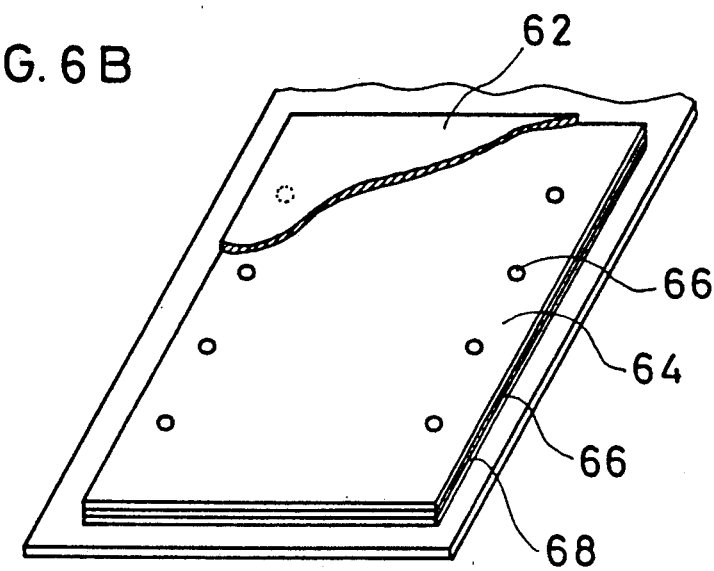

FIG. 6A and FIG. 6B are views showing a temporarily sticking material as a modification of the aforementioned embodiment.

As shown in FIG. 6A, the temporarily sticking material 60 includes a base material 62, inter-layer peel ply 64, transparent synthetic resin layer 66, adhesive layer 68 and release sheet 70.

In this temporarily sticking material 60, a part of the synthetic resin layer 66 is spotly stuck directly to the base material 62, as shown in FIG. 6B.

Hence, where the inter-layer peel ply 64 is not formed, the base material 62 is stuck to the synthetic resin layer 66 relatively strongly so that there is little risk of the base material 62 being accidentally peeled off the synthetic resin layer 66 even where the inter-layer peel ply 64 is present.

Now, described below is the method of manufacturing the temporarily sticking material 60 illustrated in FIG. 6A and FIG. 6B, referring mainly to FIG. 7 and FIG. 8.

FIG. 7 is an illustrative view showing an example of manufacturing equipment for a laminate 72 formed by laminating the base material 62, inter-layer peel ply 64 and synthetic resin layer 66.

The illustrated manufacturing equipment 80 for this laminate 72 includes a holding roller 82 for holding the strip-like base material 62 in roll form. The base material 62 held by the holding roller 82 has one end thereof pulled out and this end is led into an inter-layer release agent coating unit 84.

This inter-layer release agent coating unit 84 is for printing or coating the surface of the base material 62 with an inter-layer release agent 64a such as wax, and includes two rollers 86a and 86b.

The inter-layer release agent 64a is applied to the roller 86a. Hence, when the rollers 86a and 86b are revolved, the surface of the base material 62 being led therebetween is printed or coated with the inter-layer release agent 64a except for spots.

As the inter-layer release agent coating unit 84 may as well be used a coating machine of some other type or a known printing machine such as offset printing machine or screen printing machine.

The base material 62 printed or coated with this inter-layer release agent 64a is then led through a drying unit 88 for solidification of the inter-layer release agent 64a.

The laminate with the inter-layer release agent 64a solidified on its surface in the drying unit 88 is then led through a synthetic resin coating unit 90 for formation of a transparent synthetic resin layer 66 thereon.

In this synthetic resin coating unit 90, the surface of the inter-layer peel ply 64 of a proper thickness formed by solidification of the aforementioned inter-layer release agent 64a is printed or coated with a synthetic resin agent 66a for formation of a synthetic resin layer 66 thereon.

The laminate 72 coated with the synthetic resin agent 66a in this synthetic resin coating unit is properly wound up in roll form after solidification of the synthetic resin agent 66a.

And the laminate 72 wound up in roll form as shown in FIG. 8 is then loaded in a laminating unit 94 for formation of an adhesive layer 68.

In this laminating unit 94 a release sheet 70 is loaded in roll form, one end thereof is pulled out and is led into an adhesive coating unit 96 for having the surface of the release sheet 70 printed or coated with an adhesive 68a such as an adhesive of the pressure sensitive type.

The adhesive coating unit 96 includes two rollers 98a and 98b.

The roller 98b has its lower part kept dipped in the adhesive 68a in the bottom portion of a pan 98c. Hence when the rollers 98a and 98b are revolved, the surface of the release sheet 70 is printed or coated with the adhesive 68a. As this adhesive coating unit 96 may as well be used a coating machine of some other type or a printing machine of a known type such as offset printing machine or screen printing machine.

The release sheet 70 thus printed or coated with the adhesive 68a is then led through a drying unit 100 including, for example, a heater. In the drying unit 100, the adhesive 68a applied to the surface of the release sheet 70 by printing or coating is dried to form the adhesive layer 68. The release sheet 70 with the adhesive layer 68 formed thereon is led into a laminating unit 102.

Meanwhile, the aforementioned laminate 72 is held in roll form on a separate holding roller 104, one end thereof is pulled out and this end is led into the laminating unit 102. The laminating unit 102 includes two rollers 106a and 106b. Between these two rollers 106a and 106b, the laminate of the release sheet 70 and the adhesive layer 68 is passed through together with the laminate 72 so that the synthetic resin layer 66 of the laminate 72 is stuck to and laminated on the adhesive layer 68. When these rollers 106a and 106b are revolved, the laminate of the adhesive layer 68 et cetra and the synthetic resin layer 66 of the laminate 72 passing therethrough are stuck together and the temporarily sticking material 60 is formed thereby.

The temporarily sticking material 60 formed is wound round a take-up roller 110 to be kept in roll form.

When this is to be used, the roll may be unrolled and stamped in the desired shape as described above.

Figure 9:
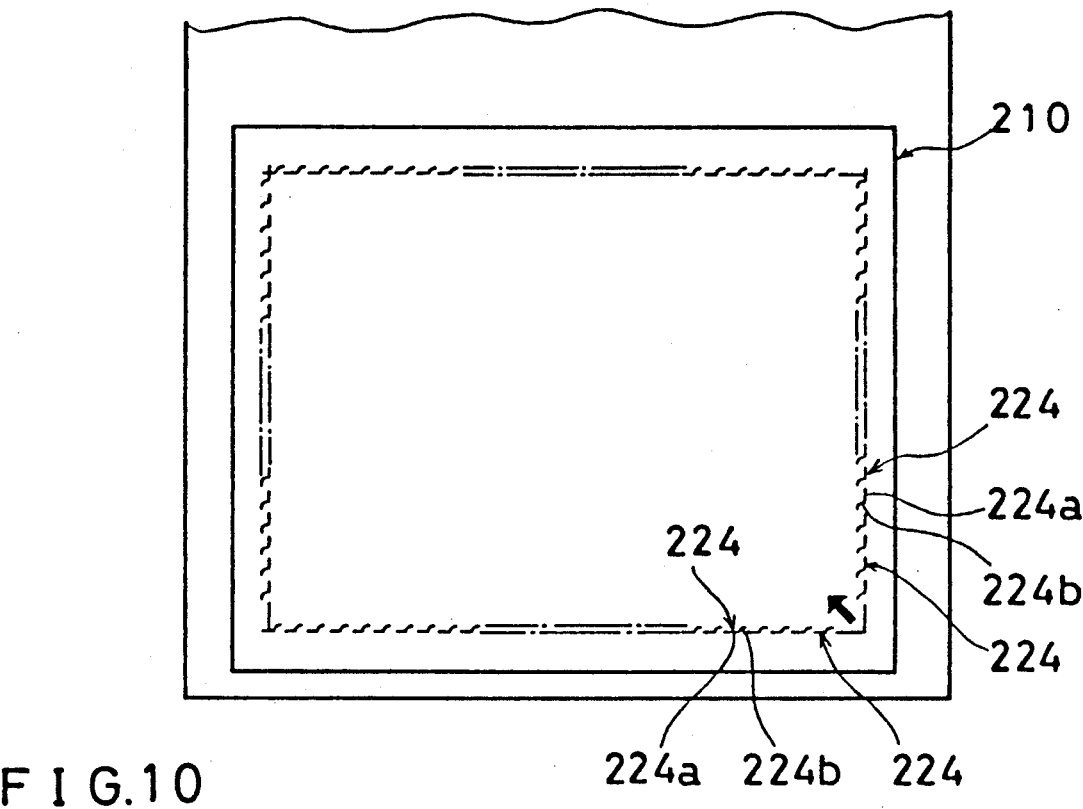
FIG. 9 is a partially plan view showing a separate embodiment of the invention.
Figure 10:
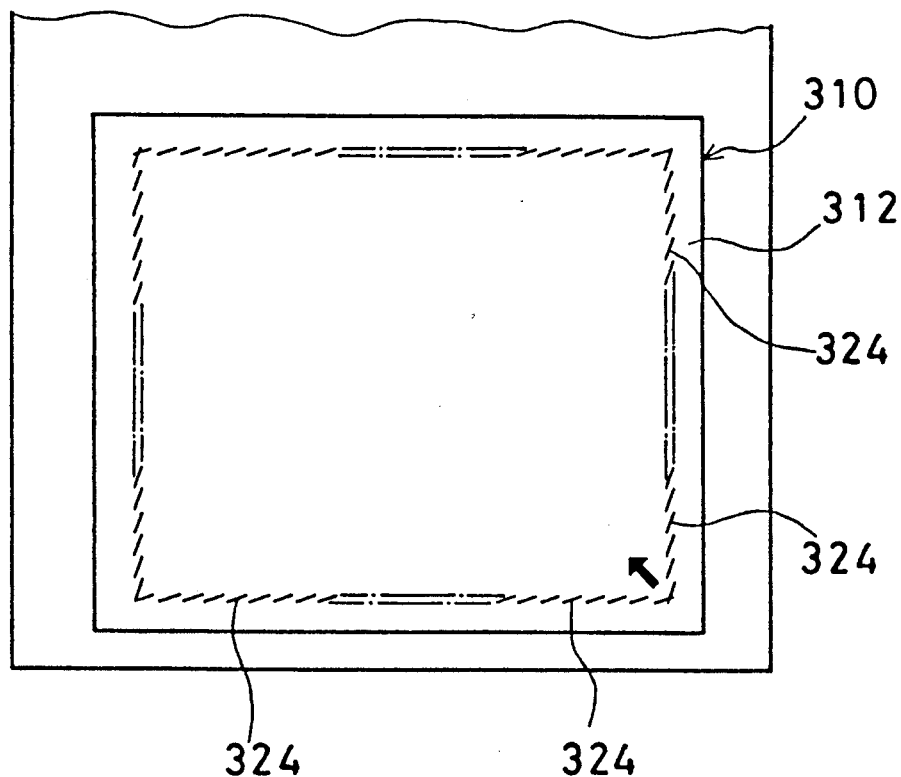
FIG. 10 is a partially plan view showing a modification of the embodiment of FIG. 9.

In each embodiment, the cuts may be formed along all edges of the base material. When the cuts are formed like that, the center portion of the temporarily sticking material is peeled off easily. In this case, as shown in FIG. 9, when each cuts are constituted with a linear cut portion and a curvilinear cut portion respectively so as to overlap a part of one cut 224 and a part of the next cut 224 in a direction for peeling the temporarily sticking material 210, the center portion of the sticking material 210 can be peeled off easily. In addition, for peeling off the center portion of the temporarily sticking material easily, as shown in FIG. 10, for example, linear cuts 324 formed along edges of the base material 312 on a slant so to overlap a part of one cut 324 and a part of the cuts 324 in a direction for peeling off the temporarily sticking material 310.

Preferred embodiments of the present invention thus have been described and illustrated in detail, it is to be understood that such description and illustration made above are solely for the purpose of explanation and not of limitation.

What is claimed is:

1. A temporary sticking material comprising a base material which is at least partially opaque, an inter-layer peel ply adhered to said base material, a resin layer which is at least partially transparent adhered to said inter-layer peel ply, a substrate, indicia means defining indicia on one side of said substrate, an adhesive layer which is at least partially transparent adhered between said substrate and said resin layer with said adhesive layer being in contact with said one side of said substrate having said indicia, said inter-layer peel ply being adhered to said resin layer with an adhering strength which is less than the adhering strength between said inter-layer peel ply and said base material, less than adhering strength between said resin layer and said adhesive layer, and less than adhering strength between said adhesive layer and said substrate, said base material and inter-layer peel ply being peelable off of said resin layer as separation occurs between said inter-layer peel ply and said resin layer, said indicia on said substrate being viewable through said transparent resin layer and said transparent adhesive layer after said opaque base material and said inter-layer peel ply have been peeled off of said resin layer.

2. A temporary sticking material according to claim 1, wherein said base material comprises a base layer coated with silver ink.

3. A temporary sticking material according to claim 1, wherein said base material comprises a base layer and an aluminum layer adhered to said base layer.

4. A temporary sticking material according to claim 1, wherein said adhesive layer comprises a pressure-sensitive adhesive.

5. A temporary sticking material comprising a base material which is at least partly opaque, an inter-layer peel ply adhered to said base material, said inter-layer peel ply having as plurality of openings, a resin layer which is at least partially transparent adhered to said inter-layer peel ply, a substrate, and an adhesive layer which is at least partly transparent adhered between said substrate sheet and said resin layer, said resin layer having spaced projections extending into said openings and adhered to said base material, said inter-layer peel ply being adhered to said resin layer with an adhering strength which is less than adhering strength between said inter-layer peel ply and said base material, less than adhering strength between said resin layer and said adhesive layer, and less than the adhering strength between said adhesive layer and said substrate, said projections on said resin layer adhering to said base material with an adhering strength greater than the adhering strength between said inter-layer peel play and said base layer, said base material and said inter-peel ply being peelable off of said resin layer as separation occurs between said inter-layer peel ply and said resin layer with said adherence between said projections and said base material providing an additional adherence to preclude inadvertent and unintended removal of said base material from said substrate.

* * * * *